(12) United States Patent
Vimalchand et al.

(10) Patent No.: US 8,689,709 B2
(45) Date of Patent: Apr. 8, 2014

(54) OXYCOMBUSTION IN TRANSPORT OXY-COMBUSTOR

(75) Inventors: Pannalal Vimalchand, Birmingham, AL (US); Guohai Liu, Birmingham, AL (US); WanWang Peng, Birmingham, AL (US)

(73) Assignee: Southern Company, Birmingham, AL (US)

( * ) Notice: Subject to any disclaimer, the term of this patent is extended or adjusted under 35 U.S.C. 154(b) by 97 days.

(21) Appl. No.: 13/405,312

(22) Filed: Feb. 26, 2012

(65) Prior Publication Data

US 2013/0055936 A1    Mar. 7, 2013

Related U.S. Application Data

(60) Provisional application No. 61/482,498, filed on May 4, 2011.

(51) Int. Cl.
*F23G 5/00*    (2006.01)
*F23J 11/00*    (2006.01)
*F23C 10/00*    (2006.01)

(52) U.S. Cl.
USPC ............. 110/245; 110/345; 110/346; 122/4 D (58) Field of Classification Search
CPC ................................ F23B 10/00; F23B 10/08
USPC ......... 110/210, 216, 245, 246, 263, 344, 346, 110/203, 212, 297; 122/4 D; 208/113
See application file for complete search history.

(56) References Cited

U.S. PATENT DOCUMENTS

| 4,103,646 A | 8/1978 | Yerushalmi et al. |
| 4,111,158 A * | 9/1978 | Reh et al. ...................... 122/4 D |

(Continued)

FOREIGN PATENT DOCUMENTS

| JP | 11082968 | 3/1999 | |
| WO | 9425148 | 11/1994 | |
| WO | WO2004050230 | * 5/2004 | ................. B01J 8/18 |

OTHER PUBLICATIONS

The Office of Clean Coal Technology, Pittsburgh Energy Technology Center, The Removal of SO2 Using Gas Suspension Absorption Technology Demonstration Project, A DOE Assessment, Sep. 1996, p. 2.*

(Continued)

*Primary Examiner* — Len Tran
*Assistant Examiner* — Tiffany Johnson
(74) *Attorney, Agent, or Firm* — Troutman Sanders LLP; Ryan A. Schneider; Dustin B. Weeks (57) ABSTRACT

A pressurized transport oxy-combustor with different configurations is disclosed. Substantially pure oxygen is fed to the transport oxy-combustor under pressure to combust fossil fuels, generating steam for power generation. The end product is the flue gas containing substantially pure $CO_2$ after moisture condensation. The low excess oxygen necessary to achieve complete combustion in the combustor is scavenged by adding another fuel so that substantially all oxygen fed to the combustor is completely consumed. The capability to operate the transport oxy-combustor as a circulating fluidized bed combustor at very high solids circulation rates makes it unnecessary to use recycled $CO_2$ or flue gas as a means to moderate and control the combustion temperature. The temperature in the combustor is effectively controlled by relatively cooler circulating solids that enter the combustion zone. A small amount of $CO_2$ is recycled for aeration and to convey solids fuel to the combustor.

22 Claims, 6 Drawing Sheets

(56) References Cited

U.S. PATENT DOCUMENTS

| | | | | |
|---|---|---|---|---|
| 4,528,945 | A * | 7/1985 | Virr et al. | 122/4 D |
| 4,579,070 | A * | 4/1986 | Lin et al. | 122/4 D |
| 5,335,609 | A * | 8/1994 | Nelson et al. | 110/346 |
| 5,365,866 | A * | 11/1994 | Von Seebach et al. | 110/345 |
| 5,715,764 | A * | 2/1998 | Lyngfelt et al. | 110/245 |
| 5,961,786 | A * | 10/1999 | Freel et al. | 202/121 |
| 6,612,250 | B2 * | 9/2003 | Ruottu et al. | 110/346 |
| 6,908,003 | B2 * | 6/2005 | Feyes et al. | 220/3.2 |
| 7,771,585 | B2 * | 8/2010 | Vimalchand et al. | 208/113 |
| 2004/0149185 | A1 * | 8/2004 | Saviharju et al. | 110/348 |
| 2005/0152814 | A1 * | 7/2005 | Lattner et al. | 422/129 |
| 2007/0271867 | A1 * | 11/2007 | Taber et al. | 52/506.03 |
| 2009/0056603 | A1 * | 3/2009 | Havlena et al. | 110/245 |

OTHER PUBLICATIONS

International Search Report and Written Opinion dated Sep. 20, 2012 for related PCT Application No. PCT/US2012/026712.

Invitation to Pay Additional Fees and, Where Applicable, Protest Fee issued by the European Patent Office, dated Jul. 30, 2012 for related PCT Application No. PCT/US2012/026712.

* cited by examiner

OXYCOMBUSTION IN TRANSPORT OXY-COMBUSTOR

CROSS-REFERENCE TO RELATED APPLICATIONS

This application claims the benefit of U.S. Provisional Application No. 61/482,498 filed 4 May 2011, the entire contents and substance of which are hereby incorporated by reference.

STATEMENT REGARDING FEDERALLY SPONSORED RESEARCH OR DEVELOPMENT

This invention was made with some Government support under Cooperative Agreement Number DE-NT0000749 awarded by the United States Department of Energy. The Government has certain rights in this invention.

BACKGROUND OF THE INVENTION

1. Field of the Invention

This invention relates generally to coal-fired electricity generating plant design, and more particularly to a transport oxy-combustor. The transport oxy-combustor is used for the combustion of coal with oxygen as oxidant to generate a substantially pure $CO_2$ stream after condensing moisture out of the flue gas.

2. Description of Related Art

Oxy-combustion is part of coal-fired electricity generating plant design that has the potential for significantly reduced $CO_2$ emissions compared to conventional coal power plant designs. In oxy-combustion, coal is combusted in an enriched oxygen environment using substantially pure or substantially pure oxygen diluted with recycled flue gas. From this process, the flue gas is composed primarily of $CO_2$ and $H_2O$, so that a concentrated stream of $CO_2$ is produced by simply condensing the water in the exhaust stream. An advantage of oxy-combustion over air-fired combustion is that it provides a high potential for a major reduction in both $CO_2$ separation and capture costs because virtually all of the exhaust effluents can be captured and sequestered.

U.S. Pat. No. 6,505,567 to Anderson et al. discloses a method of operating an atmospheric circulating fluidized bed that feeds substantially pure oxygen as oxidant to combust the fossil fuel in the combustor. A part of fine solids entrained by flue gas is cooled in an external fluidized bed heat exchanger and recycled to the lower portion of the combustor. The solids cooling process generates a small fraction of steam for power generation. The small portion of entrained, cooled solids recycled can aid in controlling the combustor temperature.

Anderson et al. also discloses recycling sufficiently large amounts of the gaseous combustion product to the combustor to control the combustor's temperature. The method of operating such a circulating fluidized bed combustor (CFB) is essentially the same as a conventional CFB combustor, except replacing air with oxygen as the oxidant. However, to control the combustor temperature, the flue gas has to be recycled back to the combustor and the rate has to be nearly the same as the amount of nitrogen that will be present in air in an air-fed combustion process.

Although the Anderson et al. type of process has substantial advantages compared to air-blown combustion when $CO_2$ capture from the flue gas is required, the large amount of flue gas recycled results in high energy consumption and reduces operating reliability. As a result, this conventional method of operation needs improvement.

Furthermore, like any air combustion process, to achieve complete combustion, excess oxygen is required and, as a result, oxygen will be present in the flue gas. Yet, the presence of oxygen in the $CO_2$ stream flue gas is undesirable for $CO_2$ sequestration or for other utilizations. The mixture of $CO_2$ and oxygen is also more corrosive in the presence of even small amounts of moisture. In addition, oxygen production is one of the most expensive steps in the combustion process, and discharging the flue gas with such precious oxygen is thus highly undesirable.

The circulation loop arrangement illustrated in Anderson et al. is similar to the most widely used commercial circulating fluidized beds. The aeration in the fluidized bed heat exchanger can have a negative impact on the cyclone performance and the overall solids circulation rates.

Oxy-fuel combustion in a CFB also suffers some common disadvantages of the air-fuel combustion process. For example, it requires large calcium-to-sulfur ratios to remove 90+% sulfur-containing compounds from the flue gas. Therefore for a stringent sulfur removal or near zero emission of sulfur components from the power plant, a flue gas desulfurization (FGD) device is required. Yet, capital and operating costs increase due to the addition of the FGD into the process.

There are at least two reasons for high calcium requirements to remove sulfur compounds. One is due to the atmospheric nature of operation—the sulfur compounds from the coal will be converted mostly to $SO_2$, which has a slower reaction rate with calcium compounds. A second reason is that the particle size used in the CFB is large, and only the surface layer of the limestone particles is utilized for sulfur capture—the core of the particles has little chance to contact with the sulfur compounds in the flue gas.

For $CO_2$ capture purposes, to produce a flue gas stream devoid of nitrogen, substantially pure oxygen is used in place of air in conventional pulverized coal (PC) boilers as disclosed in, for example, U.S. Pat. Nos. 7,282,171 and 6,918,253, and US Published Patent Applications 2009-0255450 and 2009-0257941. The methods described in these references again recycle large amounts of $CO_2$ or flue gas to moderate and control boiler temperatures.

As described above, with the oxy-combustion CFB process, such large recycling of $CO_2$ or flue gas to control combustion temperature leads to lower plant efficiencies and operational reliability. Also, the flue gas from the oxy-fired PC boiler described in these references contains a significant amount of excess oxygen that is necessary for boiler operation. Thus, an additional process step is needed to reduce the oxygen concentration to a relatively low ppm level to produce an essentially substantially pure $CO_2$ stream.

Unlike CFB combustors, in-situ sulfur removal is not feasible with PC boiler. Also, the fuel grinding costs are significantly higher with combustion in PC boilers as it requires much finer fuel for substantially complete combustion of feed coal.

What is needed are better arrangements of the circulating fluidized bed loop and better operating methods to overcome the disadvantages mentioned above. It is to such systems and methods that that present invention is primarily directed. The present invention provides new arrangements for the CFB loop and the methods of operating the loop in a pressurized oxy-combustion environment.

BRIEF SUMMARY OF THE INVENTION

Briefly described, in a preferred form, the present invention provides a transport oxy-combustor, particularly for combustion of coal with oxygen as oxidant to generate a substantially pure $CO_2$ stream after condensing moisture out of the flue gas.

In the present transport oxy-combustor, the fuel is combusted with substantially pure oxygen ($O_2$) in a riser in a substantially complete oxidation, with the result that the flue gas comprises mainly of $CO_2$ and water vapor ($C_xH_y + (x+\frac{1}{2}y) O_2 \leftrightarrow xCO_2 + (\frac{1}{2}y)H_2O$). $CO_2$ can readily be separated from $H_2O$ by a cooling step to condense the water vapor. The net flue gas then contains about 80-98% $CO_2$, depending on the fuel used and the particular oxy-fuel combustion process. The flue gas stream can be compressed, dried and further purified, providing it into condition for pipeline transport and storage.

The present transport oxy-combustor comprises a riser, a first gas-solids separation device (preferably a first stage cyclone) and a solids cooler. All combustion reactions and gas-solids mixing occur in the riser of the transport oxy-combustor. The riser comprises a primary oxygen feed and a solids fuel stream feed. In exemplary embodiments, the riser can further comprise a sorbent stream feed and/or a secondary oxygen feed.

A solids stream from the solids cooler to a lower section of the riser is mixed with oxygen from the primary oxygen feed to fully disperse the oxygen by circulating solids across the cross-section of the riser. In an exemplary embodiment, the mass flow rate of the solids in the circulating solids stream is in the range of approximately 150 to 400 times the solids fuel stream feed rate to the riser. As the combustion will be substantially complete in the various elements of the present invention, the carbon content in the circulating solids is nearly zero, and the mixing process in the lower section of the riser has a low solids temperature rise. The method of achieving substantially complete combustion and zero carbon in the circulating solids is through a combination of riser design and fuel grind size. The height of the riser is designed for sufficient residence time such that the fuel with the lowest reactivity will be fully converted. The grind size of the solids fuel stream is set to a sufficiently small size depending upon fuel characteristics to facilitate higher carbon conversion by providing high solids surface area.

The mixture of circulating solids, flue gas and other combustion products (including optionally reacted sorbent particles) flow to the top of the riser and enter the first stage cyclone. The first stage cyclone provides a solids stream to the solids cooler.

The present transport oxy-combustor can further comprise a separation assembly between the riser and first stage cyclone to facilitate separation of a portion of the solids from the gas-solids mixture. Preferably, the separation assembly promotes two streams that are mainly distinguished by solids concentration—high and low solids concentration streams. In a preferred embodiment, the separation assembly comprises an inclined crossover that utilizes gravity and the inertia of the solid particles to form the high and low solids concentration streams.

The solids cooler cools the solids stream from the first stage cyclone, and the solids returned to the lower section of the riser.

The flue gas stream leaving the present transport oxy-combustor can be cooled through a flue gas cooler, and then flow through a filtration vessel or other means to remove the remaining trace particles in the gas stream. The gas stream can be further treated to condense moisture and remove impurities, leaving a substantially pure $CO_2$ stream for sequestration or other utilizations.

The present transport oxy-combustor can further comprise a second gas-solids separation device (preferably a second stage cyclone) downstream of the first stage cyclone to collect additional fine solid particles entrained in the gas stream. Solids collected by the second stage cyclone return to the solids cooler. In this exemplary embodiment, the flue gas stream leaves the second stage cyclone with substantially less dust.

The present transport oxy-combustor is configured to process fuels with different characteristics. For large capacity and scale of combustors typical in power generation, exemplary embodiments of present invention accommodates, including, but not limited to, different arrangements of embedded solids coolers to generate steam. A further exemplary embodiment of the present transport oxy-combustor is to inject a scavenging fuel to remove excess oxygen in the flue gas. Exemplary embodiments of the transport oxy-combustor operate in pressurized environments with sorbent injection, and can remove substantially all polluting sulfur components in the flue gas.

The present transport oxy-combustor comprises a pressurized circulating fluidized bed loop that facilitates oxygen-fired combustion of coal, overcoming limitations identified above with the existing CFB units and PC boilers. The new configuration, herein "transport oxy-combustor" (TROC™), comprises an embedded solids cooler, and circulates solid particles at a higher mass flow rates per unit cross-sectional area of the riser.

According to one aspect of the invention, oxygen is distributed to the circulating fluidized bed without an internal distributor. The combustor configuration for solids circulation inside the bed provides the opportunity to evenly distribute the oxygen in the circulating loop so that the oxygen combustion process at high temperatures inside the reactor will not have hot spots that are known to generate clinkers in the combustor.

Another aspect of the present transport oxy-combustor is its capability to operate at elevated pressures. Preferably, it has an operating pressure above approximately 150 psia, which reduces the size of the equipment in the circulating loop as well as the size and number of downstream equipment. Higher pressure operation improves heat transfer, emissions control, process efficiency, while decreasing overall capital costs.

As large amount of solids circulate in the loop, one objective of the invention is for circulating solids to flow to the solids cooler directly from the natural flow separation that occurs in the separation assembly. According to one aspect of the invention, the separation assembly comprises an inclined crossover between the riser and the first stage cyclone. The solids flow from the top of the riser and are inclined downwardly between the riser exit and the solids entrance to the solids cooler. The gas and residual solids stream then flows horizontally to the inlet of the first stage cyclone. Preferably, more than 50% of the solids are separated out from the inclined crossover flow stream and enter into the solids cooler.

It is another objective of the invention that a portion of aeration gas, introduced into the solids cooler to assist the solids to both flow in the cooler and increase the heat transfer rate in the cooler, flow upwards to the entrance of the solids to the cooler. The aeration gas along with flue gas from riser further flow into a first stage cyclone, which is downstream the solids entrance to the cooler inlet. The mixture of aeration and flue gas aides in the solid particles flowing to the first stage cyclone to remain fully suspended in the gaseous stream. The increased stream velocity and uniform distribution of solid particles across the cross-section at the entrance of the first stage cyclone improve the solids collection efficiency of the cyclone. The suspended solids collected by the first stage cyclone will flow directly into the Standpipe.

According to another aspect of the invention, the flow rate of solids to the cooler, and thus the steam generation rate in the solids cooler, is controlled by the aeration rate in the cooler. Another means of solids flow rate control to the solids cooler is with a narrowed circular throat at the entrance. Further, the gas upward flow velocity through the throat can also retard the solids flow rate to the cooler.

According to another aspect of the invention is to provide a unique elevation of the solids cooler and the solids level in the cooler. When low steam production rate is required, the solids level in the cooler will only cover a portion of the heat transfer area. Since the uncovered heat transfer surface areas have a lower heat transfer coefficient compared to those covered by the solids, the overall steam production rate is decreased from the solids cooler. Therefore, the solids height in the cooler becomes a means to attain desired steam production rates.

A second stage cyclone can be used to further collect the solids escaping from the collection of the first stage cyclone. The solids collected by the second stage cyclone will return to the solids cooler through a downcomer and a seal-leg or loop seal arrangement. The column of solids in the seal-leg prevents reverse flow of gas which can spoil the cyclone and lower its collection efficiency. The type of solids collections system and the need for the second stage cyclone highly depends on the characteristics of the solids fuel chosen for combustion.

The present invention can further comprise the addition of a gaseous fuel or nonvolatile solid to the exit of one or both of the first and second stage cyclones. The added fuel reacts with excess oxygen present in the flue gas, thus scavenging the oxygen from the flue gas. A scavenging reaction takes place in the crossover and in the cyclone. It is preferred that fuel injected into the crossover for oxygen scavenging be nearly sulfur substantially free. If the scavenging fuel contains sulfur compounds that form $SO_2$ and $SO_3$, sorbent for sulfur absorption will also be injected with the fuel to remove sulfur oxides from the flue gas.

The present invention can further comprise the injection of atomized water with high pressure $CO_2$ to the crossover to reduce excessive temperature that may result with combustion of the scavenging fuel. The need for water injection depends upon the level of residual oxygen in the combustor. As the transport oxy-combustor is operated at elevated pressures, an advantage with water injection is the recovery of latent heat when the flue gas is cooled to condense the moisture to generate the substantially pure $CO_2$ stream.

The characteristics of solid fuel chosen for combustion, excess oxygen that may be necessary for complete combustion, and the characteristics of any scavenging solids fuel necessary to generate a substantially oxygen-free flue gas stream may necessitate a third gas-solids separation device (preferably a third stage cyclone) to reduce the concentration of fine solid particles for safe operation of downstream equipment. The third stage cyclone also increases the gas residence time and reduces the carbon monoxide content in the flue gas. The temperature of the flue gas at the exit of the combustor and third stage cyclone depends on the fusion temperature of the fly ash. It is preferred that the flue gas temperature be approximately 50° F.-150° F. below the ash fusion temperature of the ash.

In another preferred embodiment of the present invention, the transport oxy-combustor operates above 10 bars pressure to effectively remove approximately 100% of sulfur oxides from the flue gas with sorbent injected into the combustor with calcium-to-sulfur molar ratios below 1.3. Such low molar ratios are feasible due to the pressurized environment and high mass fluxes of circulating solids in the transport oxy-combustor. Lower operating costs are realized with low molar ratios, as less sorbent is needed and less waste is generated for disposal.

With the transport oxy-combustor operating at elevated pressures, improved process efficiencies are provided. Steam is generated in a flue gas cooler by cooling the flue gas stream exiting the combustor. Higher heat transfer coefficients are realized at higher pressures as it is nearly directly proportional to pressure. The flue gas stream is further cooled, and the moisture condensed to generate a substantially pure $CO_2$ stream at elevated pressures. There can be a significant advantage operating at elevated pressure. If the pure $CO_2$ stream is compressed to relatively high pressures for transportation, sequestration or other end uses, the marginal cost of compressing the pure $CO_2$ stream from the transport oxy-combustor can be significantly lower as the transport oxy-combustor operates at relatively elevated pressures. Useful heat can be extracted by condensing moisture at high pressures as the saturation temperature is higher at elevated pressures.

According to a preferred embodiment of the present invention, the gas phase superficial velocity in the riser of the circulating fluidized bed is in the range of approximately 18 to 50 ft/s. Such high gas velocities increases the solids circulation rate, as the combustor operates in a flow regime called transport regime in which the carrying capacity of the gas facilitates flow of circulating solids through the riser.

High mass flux of solid particles through the riser has the following beneficial advantages over the conventional systems: (i) it promotes combustion reactions to completion, (ii) it exponentially increases the ability to absorb large amounts of released heat while maintaining combustion temperatures without the need for any recycled $CO_2$ or flue gas (required in the prior art); and, (iii) it enables substantially complete capture of sulfur components with high sorbent utilization.

The mixing of large amounts of circulating cooler solids with fuel and oxygen allows for the maintenance of stable combustion conditions (temperature). Like in refrigeration, the present invention absorbs heat rapidly from the combustion zone, and rejects it in the solids cooler, where, in essence, the circulating solids are the "refrigerant".

According to another preferred embodiment of the present invention, the solids circulation rate to the carbonaceous solids fuel mass ratio is in the range of approximately 150 to 400, to limit if not avoid any possibility of hot spots when substantially pure oxygen is used for combustion. The high solids circulation rate also makes it possible for high steam production rates and high solids carbonaceous fuel throughput in the combustor.

Such high solids circulation rates enable unusually high energy throughputs based on the riser cross-sectional area, which is in the range of approximately 20,000 to 70,000 $Btu/ft^2$-sec or 70 to 250 million $Btu/ft^2$-hr. The solids circulation rate is mainly controlled by the solids level in the standpipe and solids cooler, and finely tuned by the aeration rates to adjust and maintain desired riser temperatures.

These and other objects, features and advantages of the present invention will become more apparent upon reading the following specification in conjunction with the accompanying drawing figures.

BRIEF DESCRIPTION OF THE DRAWINGS

Various features and advantages of the present invention may be more readily understood with reference to the following detailed description taken in conjunction with the accompanying drawings, wherein like reference numerals designate like structural elements, and in which.

DETAILED DESCRIPTION OF THE INVENTION

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

The present invention is a transport oxy-combustor comprising a riser comprising a primary oxygen feed and a solids fuel stream feed, a first gas-solids separation device, and a solids cooler with an exit cooler solids stream, wherein the exit cooler solids stream travels from the solids cooler to a lower section of the riser, where the exit cooler solids stream disperses oxygen from the primary oxygen feed, wherein the combustion of the solids fuel stream and dispersed oxygen in the riser in the presence of the exit cooler solids stream moderates and controls the combustion temperature in the riser, wherein the gas-solids mixture in the riser enters the first gas-solids separation device, and wherein the first gas-solids separation device provides a solids stream to the solids cooler.

The riser can further comprise one or more of a sorbent stream feed and a secondary oxygen feed. The mass flow rate of the solids in the circulating solids stream can be in the range of approximately 150 to 400 times the solids fuel stream feed rate to the riser. The transport oxy-combustor can further comprise a separation assembly located between the riser and the first gas-solids separation device, the separation assembly facilitating separation of a portion of the solids from the gas-solids mixture. The transport oxy-combustor can further comprise a second gas-solids separation device downstream of the first gas-solids separation device to collect fine solid particles entrained in the gas stream, and return them to the solids cooler.

The present invention is also a transport oxy-combustor comprising a riser comprising a shell and insulation and erosion resistant refractory liners, wherein in the riser carbonaceous solids fuel is combusted in the presence of oxygen and circulating solids, which combustion forms a flue gas stream comprising a gas-solids mixture, a first stage cyclone having an inclined tangential inlet, an inclined first crossover connecting the riser with the first stage cyclone, a second stage cyclone, a second crossover connecting the first stage cyclone exit to the second stage cyclone, a third stage cyclone consuming excess oxygen in the flue gas stream with a scavenging solids fuel, a standpipe, a seal-leg under at least one of the first and second stage cyclones to return solids to the standpipe, and to provide a seal from a reverse flow of the flue gas stream, and at least one solids cooler, wherein the standpipe provides communication between the cyclones to the at least one solids cooler, wherein the at least one solids cooler is used to transfer combustion heat from the circulating solids to water and steam, forming one or more of steam and superheated steam.

The riser can further comprise at least one fuel injection nozzle in a lower section of the riser to feed the carbonaceous solids fuel to the riser, at least two primary oxygen injection nozzles in the lower section of the riser to feed oxygen into the riser at different elevations along the lower section of the riser, at least two secondary oxygen injection nozzles above the at least one fuel injection nozzle to feed oxygen into the riser at different elevations, and at least two sets of aeration nozzles to feed an aeration gas in a lower section of the at least one solids cooler and the seal-leg to facilitate solids flow and heat transfer. The riser can further comprise a sorbent feed adding sorbent to the riser to at least partially remove unwanted species from the flue gas, and the unwanted species can be sulfur oxides, wherein the sorbent is one of limestone or dolomite, and wherein the molar ratio of calcium to sulfur is less than approximately 1.3.

The transport oxy-combustor can have an operating pressure in the range of approximately 30 and 1000 psia. The transport oxy-combustor can have a solids circulation rate to the carbonaceous solids fuel mass ratio in the range of approximately 150 to 400, wherein the combustion of the solids fuel and oxygen in the riser in the presence of the circulating solids moderates and controls the combustion temperature in the riser. The transport oxy-combustor can have a solids circulation rate to the carbonaceous solids fuel mass ratio in the range of approximately 150 to 400, wherein at least one of the at least one solids cooler is an upward flow solids cooler located under the riser.

The first stage cyclone can have an inclined inlet solids loading capacity in the range of approximately 10 to 40 pounds of solids per pound of gas. The first stage cyclone can have an inlet velocity in the range of approximately 25 and 55 ft/s.

The transport oxy-combustor can have one of the at least one solids coolers located at the bottom of the standpipe, such that circulating solids flow downwards into the at least one solids cooler located at the bottom of the standpipe and upwards and merge into the riser for one of the at least one solids cooler located at the bottom of the riser.

The transport oxy-combustor having at least two solids coolers can comprise one having downward and one having upward solids flow through the at least two solids coolers. The upward flow solids cooler can use oxygen as an aeration gas at the bottom of the solids cooler to minimize $CO_2$ recycle to the transport oxy-combustor.

Excess oxygen can be utilized by injecting a gaseous or solids scavenging fuel at the exit of one of the first or second stage cyclones.

The present invention also comprises a transport oxy-combustor comprising a riser comprising a primary oxygen feed and a fossil fuel stream feed, a first gas-solids separation device, and a solids cooler with an exit cooler solids stream, wherein the exit cooler solids stream travels from the solids cooler to a lower section of the riser, where the exit cooler solids stream disperses pressurized oxygen from the primary oxygen feed, wherein the combustion of the fossil fuel stream and oxygen in the riser form flue gas exiting the riser, wherein the flue gas in the riser enters the first gas-solids separation device, wherein the first gas-solids separation device provides a solids stream to the solids cooler, and wherein the flue gas contains substantially pure $CO_2$ after moisture condensation.

The transport oxy-combustor can act as a circulating fluidized bed combustor at sufficiently high solids circulation rates to make it unnecessary to use recycled $CO_2$ or flue gas as a means to moderate and control the combustion temperature in the riser.

The temperature in the riser can be effectively controlled by relatively cooler circulating solids that enter the lower section of the riser. An amount of $CO_2$ can be recycled for limited aeration and to convey solids fuel to the riser. Excess oxygen necessary to achieve complete combustion in the riser can be scavenged by adding a scavenging fuel so that substantially all oxygen fed to the riser is completely consumed.

Figure 1:
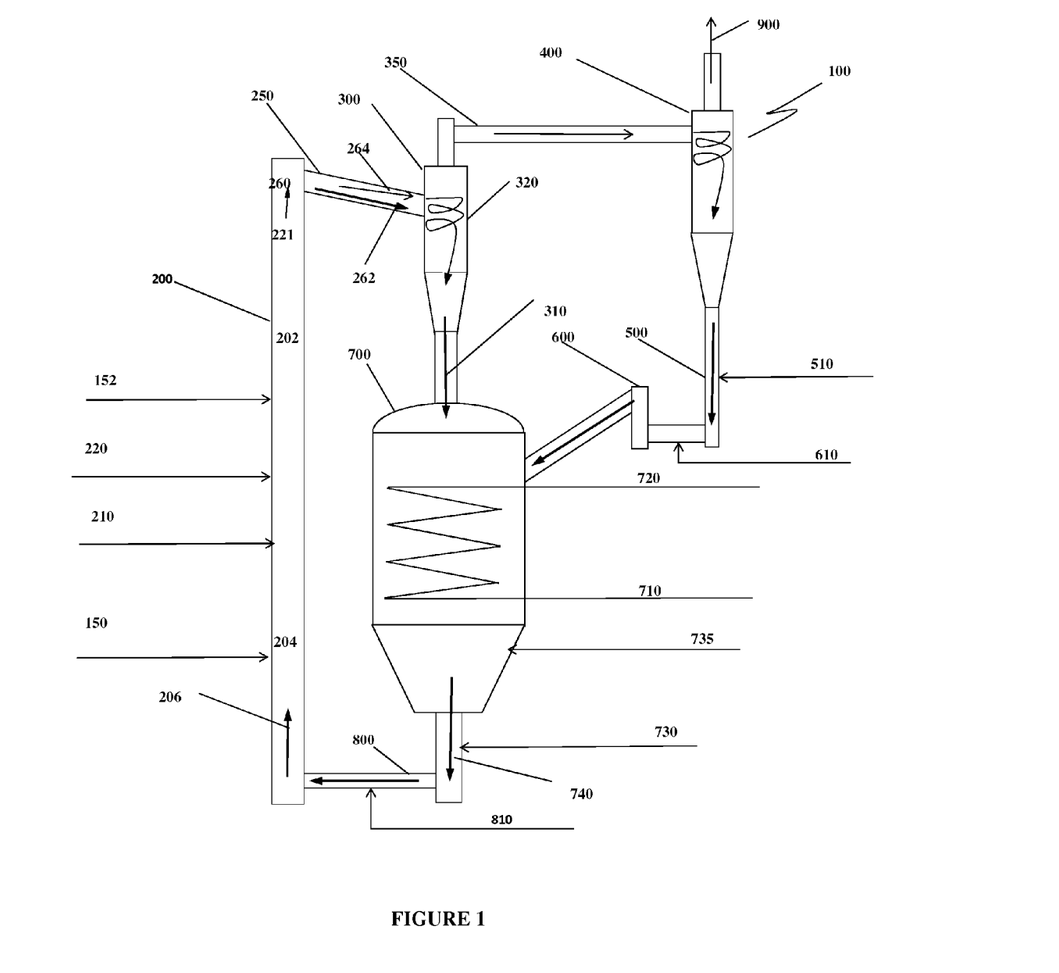
FIG. 1 is a schematic of the present oxy-fuel transport combustor loop configuration with gas up flow in the riser, a down flow solids cooler, two stages of gas-solids separation devices and a seal-leg between the second stage cyclone and solids cooler, according to an exemplary embodiment.

In FIG. 1, the solids circulation loop of the transport oxy-combustor is represented by 100. The transport oxy-combustor comprises a riser 200 that has a tall cylindrical shell 202 preferably lined with refractory (not shown). The refractory comprises dual layers—an outer insulating layer that maintains the carbon steel shell below approximately 300° F., and an inner erosion-resistant layer that protects the shell and insulation layer from erosion due to high solids circulation rates. Substantially all combustion reactions and gas-solids mixing occur in the riser of the combustor.

The primary oxygen 150 is fed through various nozzles along the height of the riser. About 20-80% of the primary oxygen is fed through nozzles in the lower section of the riser 204 to react with carbon left in the circulating solids. The overall gas superficial velocity after oxygen stream 150 is added can range from approximately 8 to 35 ft/s depending upon the desired solids circulation rate. A preferred gas superficial velocity is in the range of approximately from approximately 10 to 25 ft/s.

The oxygen fed to section 204 is mixed with solids stream 206 from the solids cooler to fully disperse the oxygen by circulating solids across the cross-section of the riser. The mass flow rate of the solids in the circulating solids stream 206 is preferably approximately 150 to 400 times the carbonaceous material's carbon feed rate to the combustor. As the combustion is substantially complete with various elements of the present invention, the carbon content in the circulating solids 206 is substantially zero, and the mixing process in the lower section of the riser has a low solids temperature rise.

A method of achieving substantially complete combustion and substantially zero carbon in the circulating solids is through a combination of riser design and fuel grind size. The height of the riser 200 is designed for sufficient residence time such that the fuel with the lowest reactivity will be fully converted. The grind size of the solids fuel stream 210 is set to sufficiently small size depending upon fuel characteristics to facilitate higher carbon conversion by providing high solids surface area. For example, low reactivity fuels can be pulverized to a mean particle size of approximately 100 to 250 microns based on mass mean diameter, and to a mean particle size of approximately 200 to 700 microns for high reactivity fuels. The flexible mean particle size is one of the operating aspects of the current invention that is different compared to the conventional operating CFB units for power generation.

The circulating solids entering the bottom section of the riser 204 have a temperature in the range of approximately 700° F. to 1200° F., depending on the feed fuel reactivity. According to one aspect of the invention, the pulverized carbonaceous feed stream 210 is added to the combustor through nozzles located above the primary oxygen feed nozzles. The solids fuel is conveyed with $CO_2$ gas recycled to the coal feeder after the combustion product has been purified.

The mass flow rate of conveying gas required per unit mass of coal fed depends upon the combustor operating pressure and the type of conveying method (lean or dense phase, for example) chosen to convey the coal. The amount of carbon in the feed stream entering the combustor can be more than the amount required to consume substantially all primary feed oxygen that enters the combustor section below the feed nozzles. Therefore, the combustion reaction in the lower section of the riser is sub-stoichiometric, and the combustion product is substantially $NO_x$-free compared to the stream from complete combustion. The combustion products and remaining unconverted carbon flow upwards in the riser as the gas velocity is higher than the terminal velocity of the largest particles in the riser.

Additional secondary oxygen stream 152 can be added through various nozzles in the mid- to upper-portion of the riser to further combust the remaining combustibles. The number of secondary oxygen nozzles in the stream 152 can be up to five different levels along the height the riser in a preferred embodiment; on each level, two to six nozzles are designed to inject secondary oxygen into the riser. After the secondary oxygen addition from 152, the oxygen volume percent in the gas phase in the riser is approximately 2-5%. The temperature in the upper riser section 221 above the secondary oxygen stream 152 nozzles is in the range of approximately 1550° F. to 2000° F., depending on the reactivity of the fuel and the ash fusion temperatures.

According to an exemplary embodiment of the present invention, sorbent stream 220 is added to the riser section of the transport oxy-combustor. The sorbent fed to the riser can be, for example, limestone (mainly calcium carbonate $CaCO_3$), dolomite (a mixture of calcium and magnesium carbonates) or other sorbents that will stay in the solids phase in the operating temperature range of approximately 1550° F. to 2000° F. A main purpose of feeding the sorbent to the riser is to remove substantially all of the sulfur components from the flue gas. It is known that $CaCO_3$ can react with both $SO_2$ and $SO_3$ generated by the combustion reactions, but not very effective in reacting with $H_2S$. In a preferred embodiment, the lowest feeding location of the sorbent stream 220 is at least above one level of the secondary oxygen stream 152, as the sorbent should be fed into the oxidization atmosphere in the riser. The mean sorbent particle size should be in the range of approximately 30-300 microns to be effective in removal of sulfur oxides from the flue gas. The molar ratio of calcium in the sorbent to the sulfur in the coal should be in the range of approximately 1.0 to 1.3 to remove substantially all sulfur components from the flue gas.

The mixture of circulating solids, flue gas and other combustion products and reacted sorbent particles flow to the top of the riser and enter an inclined crossover 250. The gas superficial velocity at the top of the riser is in the range of approximately 25 to 75 ft/s, and a preferred gas velocity is in the range of approximately 25 to 50 ft/s for the configuration shown in FIG. 1.

A function of the inclined crossover is not only to connect the riser 200 and the first stage cyclone 300, but also to facilitate separation of a portion of the solids from the gas-solids mixture by gravity. In the process of making a turn into the crossover and flowing along the inclined length of the crossover, the gas-solids mixture stream 260 will naturally separate into two streams under the influence of both gravity and the inertia of the solid particles. These two streams are mainly distinguished by their solids concentration; high and low solids concentration streams 262 and 264.

The high solids concentration stream 262 flows along the bottom of the crossover and the amount of solids salting out into this stream increases as the gas-solids mixture flows down the inclined crossover. The stream 264, leaner in solids loading, flows along the top portion of the crossover. Besides the concentration of solids, the particle sizes are also different in these two streams. Larger particles mainly stay with the high solid concentration stream 262 and the smaller particles stay suspended with the low solids concentration stream 264.

When both streams 262 and 264 enter the first stage cyclone 300, the solids in the stream 262 fall into the cyclone barrel as a stream without undergoing any substantial cyclonic action. The small particles acquire centrifugal force as they spin along the cyclone wall, and thus separate from the gas stream. The lifespan of the cyclone is significantly increased as the smaller particles are much less severe in causing erosion of the cyclone inner wall 320.

The first stage cyclone is preferably a refractory lined vessel, as disclosed in U.S. Pat. No. 7,771,585 and hereby incorporated by reference in its entirety, which can reliably facilitate high solids circulation rates and mass fluxes important to proper transport oxy-combustor operations.

The solids stream 320 collected by the first stage cyclone 300 flows into a solids cooler or heat exchanger 700. Inside the solids cooler 700 are heat transfer surfaces where the solids particles exchange heat with fluid inside the cooling surface. The cooling fluid inside the heat exchanger surface can be, for example, water or steam.

The solids in the solids cooler 700 are fluidized in one exemplary embodiment of the present invention. The particles exchange heat with the heat transfer surfaces built in the solids cooler. When the cooler is in a fluidized state, the solids side is essentially the same temperature and in the range of approximately 800° F.-1400° F. The fluidization of the particles in the bed relies mainly on the velocity difference between the solids and gas. A small amount of aeration gas can be added through the aeration steams 730 and 735 to facilitate the solids particle movement in the bottom exit of the cooler.

Under a fluidization state, the solids downward flow velocity is in the range of approximately 3 to 10 ft/s, with a preferred solids velocity in the range of approximately 4 to 6 ft/s. The velocity difference between the solids and gas is in the range of approximately 0.2 to 0.8 ft/s. The solids velocity is mainly controlled by the solids level in the solids cooler, and the aeration rates through 730 and 735, while the gas velocity in the riser has minor effects. The circulating solid particles mainly comprise ash generated from combusting carbonaceous fuel like coal, and particle sizes are in the range of approximately 60 to 200 microns.

In another exemplary embodiment of the present invention, the solids cooler can operate as the moving bed solids cooler. In this mode of operation, the solids circulation rate is relatively low, and the solids downward velocity is in the range of approximately 0.5 to 1.5 ft/s. This mode of operation is realized with larger particles in the size range of approximately 150 to 400 microns in the circulating loop. The aeration rates through 730 and 735 are minimized with moving bed operation. The velocity difference between the gas and solids for this operating mode is in the range of approximately 0.03-0.1 ft/s. The moving bed mode is mainly realized by lowering the solids level in the cooler.

Although the fluidized operation is the desired mode of solids cooler operation for the embodiment shown in FIG. 1, the moving bed mode is beneficial when the plant is essentially idle for a short duration when, for example, electricity production or steam generation is not required. To keep the combustor in a warm state and ready to be on-line for production, it is beneficial to operate the cooler in the moving bed mode to minimize energy consumption during standby mode.

In either mode of operation, the exit temperatures of the solids cooler will be similar. The only difference for a given design between the two operating modes is the amount of steam generated by the cooler due to changes in operating parameters, as mentioned above.

The cooled solids stream 740 leaving the solids cooler at a temperature in the range of approximately 900° F. to 1400° F. flows through a non-mechanical valve 800 that has an angle in the range of approximately from 0 to 45 degrees upward relative to the horizontal line. Aeration gas 810 can be added to the non-mechanical valve to facilitate the solids flow through the valve to the riser, and in order to maintain the desired solids circulation rate around the combustor loop.

In the configuration as shown in FIG. 1, another cyclone 400 is added downstream of the first stage cyclone to collect additional fine solid particles entrained in the gas stream. This second stage cyclone is of conventional design due to low solids loading in the gas stream at the inlet. The solids collected by the second stage cyclone return to the solids cooler through a downcomer 500 and a seal-leg or loop seal arrangement 600. The column of solids in the seal-leg limits or prevents the reverse flow of gas that can spoil the cyclone and lower its collection efficiency. Aeration gas streams 510 and 610 can be added to facilitate solids flow in the downcomer and seal-leg.

The gas stream 900 leaving the second stage cyclone 400 is substantially dust substantially free, but contains 2-5% oxygen. The gas stream can be cooled through a flue gas cooler (not shown in FIG. 1), and then flow directed through a filtration vessel or other means to remove remaining trace particles in the gas stream. The gas stream can be further treated to condense moisture and remove impurities, and generate substantially pure $CO_2$ for sequestration or other utilizations.

The pressure of the flue gas stream 900 leaving the cyclone 400 can be in the range of approximately 30 to 1000 psia, wherein a preferred operating pressure is in the range of approximately 150 to 700 psia. The oxy-combustor operates under pressure to overcome the disadvantages of boilers and combustors operating at atmospheric or slightly negative pressure, such as leakage of air into the flue gas stream and high recycle $CO_2$ rates. It is advantageous to operate at high operating pressure as it facilitates high solids circulation rates with large solids carrying capacity of gas at high densities. Even heat distribution without hot spots can be realized with a high mass ratio of circulating solids to carbon fed to the transport oxy-combustor.

In one embodiment of the present invention, the solids fuel feed rate to the riser is in the range of approximately 20,000-70,000 $Btu/ft^2$-sec or 70-250 million $Btu/ft^2$-hr. Another advantage of operating at higher pressures in transport oxy-combustor is the near complete removal of sulfur oxides from the flue gas with a sorbent, eliminating the need for scrubbers.

Figure 2:
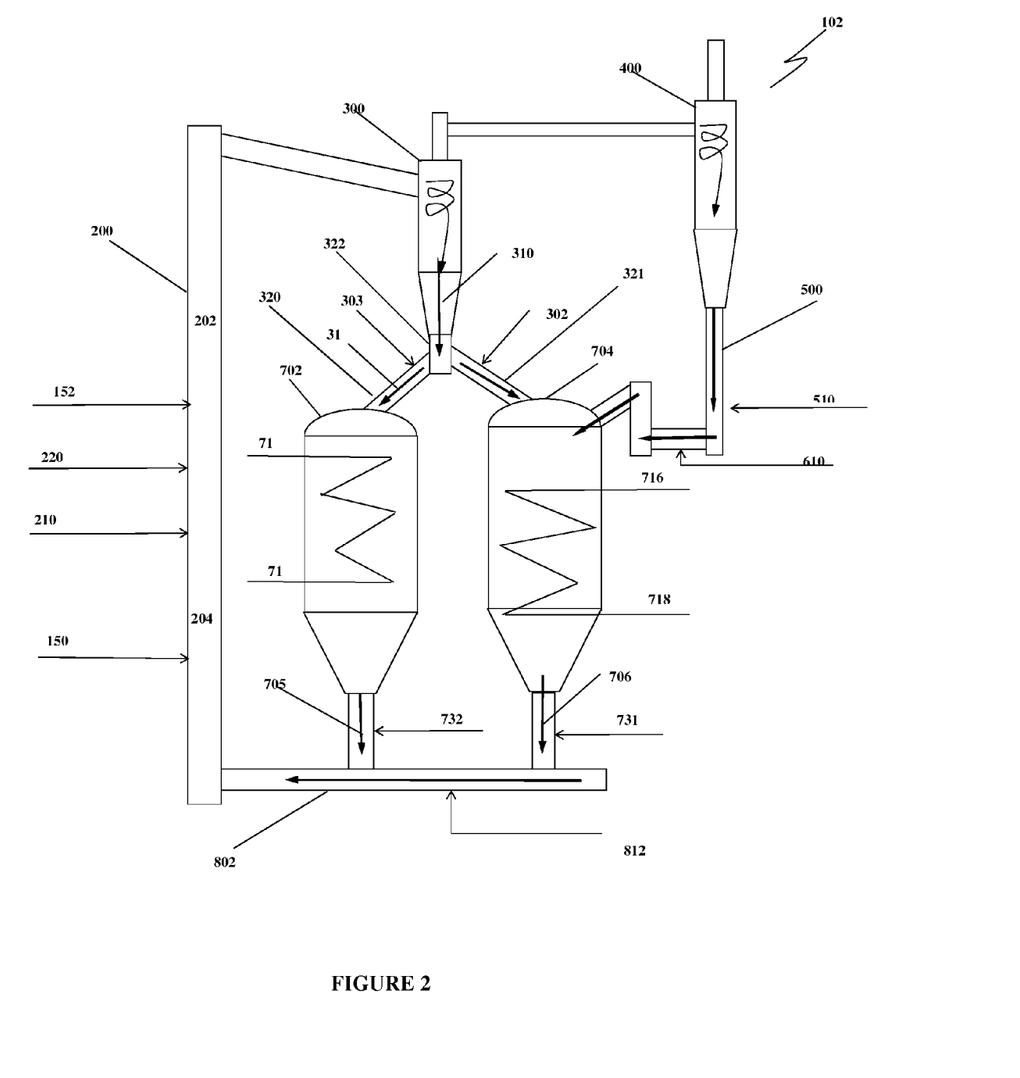
FIG. 2 is a schematic of the oxy-fuel transport combustor loop configuration with more than one downward flow solids coolers, according to an exemplary embodiment.

The transport oxy-combustor 102 shown in FIG. 2 has more than one solids cooler, 702 and 704, to cool the circulating solids before returning to the lower part of the riser. As the capacity of the combustor increases, processing more fuel and releasing larger amounts of heat, the heat transfer surface area in the solids cooler should also increase to transfer released heat to the cooling (preferably water and steam) system. For large commercial units, two solids coolers accommodate the necessary heat transfer area.

The solids collected by the first stage cyclone 300 flow downward to a divider and then to the solids coolers. The solids level in the cyclone dipleg 322 controls the solids flow to the coolers. It is preferred that the solids level in the cyclone dipleg be above the flow division points so that the solids coolers are full of solids. Solids flow to each cooler also can be controlled by non-mechanical valves. The connection device between the first stage cyclone dipleg 322 and the solids coolers 702 and 704 can be a seal-leg or an L-valve (not shown) to control the solids flow with aeration.

The flow rates through aeration streams 731 and 732 also can control the solids flow rates through the solids coolers. In a preferred embodiment, the aeration streams 731 and 732 comprise oxygen to reduce consumption of the recycle aeration gas, and to produce a better mixing of the solids and the oxygen before the stream enters the lower part of the riser. The use of oxygen for aeration of the cooler solids outlet has little to no detrimental effect on the operation of the combustor. By design, the carbon content in the circulating solids is substantially zero due to the rapid combustion reactions in the riser, which will consume substantially all the carbon in the fuel.

The solids streams 705 and 706 from the solids coolers both feed into a single non-mechanical valve 802. The configuration of the non-mechanical valve can be, for example, one of the following: L-valve (as shown in FIG. 2), J-valve or loop seal, each familiar to those of skill in the art. Aeration stream 812 can feed into a plurality of nozzles in the L-valve to fluidize and aid in solids flow. Aeration gas into these nozzles also can comprise oxygen.

Figure 3:
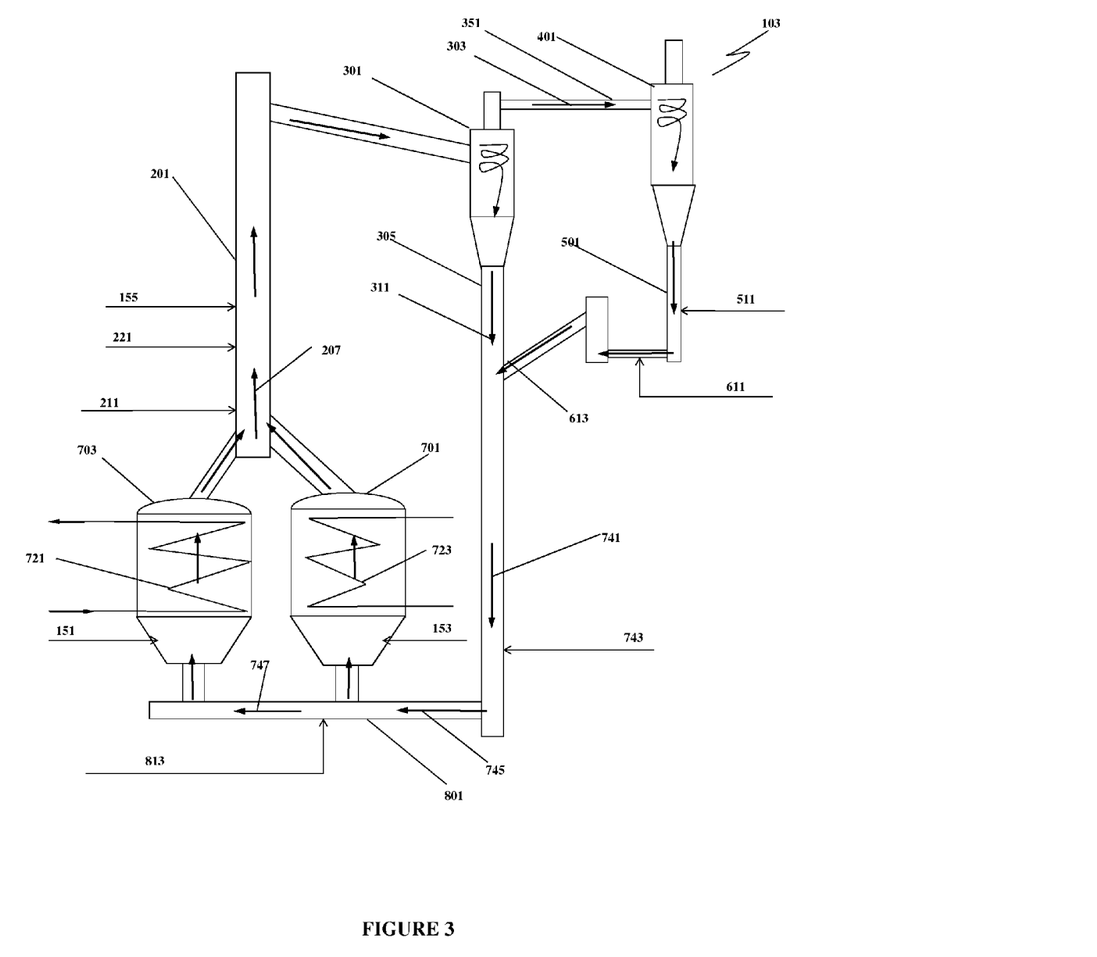
FIG. 3 is a schematic of the present oxy-fuel transport combustor loop configuration with more than one upward flow solids coolers and a standpipe, according to an exemplary embodiment.

The transport oxy-combustor configuration shown in FIG. 3 also has two solids coolers with the solids flowing through the cooler in an upward direction. The upward flow coolers fully utilize the combustor loop for highly reactive fuels as the gas residence time required in the riser to achieve substantially complete carbon conversion is in the range of approximately 0.5 to 1.5 seconds. Such relatively short residence times require a smaller riser, and the solids cooler can be positioned below the riser. The combustor loop in FIG. 3 comprises a riser 201, a first-stage cyclone 301, a standpipe 305, a non-mechanical valve 801 and upward flowing solids coolers 701 and 703. The coarser solids stream 311 from the first stage cyclone 301 mixes with the fines stream 613 flowing from a secondary cyclone 401 and its dipleg 501, and the combined stream 741 moves down the standpipe by gravity and flows to the solids coolers and riser through the non-mechanical valve 801 to complete the circulation loop. This embodiment decreases overall height of the combustor for highly reactive fuels.

Oxygen streams 151 and 153 can be added to the cone of the solids coolers to partially convey the solids upward, and to fluidize the solids in the cooler. Since the returning solids from the standpipe contain substantially zero combustible materials, chances of temperature rise due to combustion reactions are relatively low. Even if small amounts of carbon are present in the circulating solids streams 745 and 747, the temperature increase is suppressed by the cooling surface in the cooler.

In a preferred embodiment of the present invention, the aeration stream 814 to the non-mechanical valve 801 comprises oxygen. The gas-solids mixture temperatures leaving the solids coolers are in the range of approximately 800° F. to 1400° F. As oxygen is used for aeration and fluidization in non-mechanical valve and solids coolers, the need to recycle $CO_2$ is minimized.

The solids coolers 701 and 703 in FIG. 3 and the solids coolers in other configurations can be used to heat up water, generate steam or generate superheated steam. It is also possible to have one part of the solids cooler heat exchanger surface for steam generation, and another part for steam superheater, and a third part as an economizer.

The solids from the solids coolers 701 and 703 through the connecting pipe are merged in the riser stream 207. Although only two solids coolers are illustrated in configurations shown in FIGS. 2 and 3, it will be understood by those of skill in the art that an appropriate number of coolers depend upon the characteristics of feed fuel. It is known that the acceleration zone at the bottom of the riser is a limiting factor for the solids throughput or the solids flux through the riser. With multiple coolers in the bottom of the riser, the solids flux in the riser can be further improved. With multiple coolers under the riser, the mass ratio of the circulating solids to the carbon feed rate to the riser can be in the range of approximately 150 to 400. The increase in the solids circulation rate also promotes beneficial steam production rates.

The carbonaceous solids fuel stream 211 is added to the bottom of the riser to react with the oxygen exiting the solids cooler. The temperature increment after the fuel reacts with substantially all the oxygen fed from below the fuel nozzles is in the range of approximately 50° F. to 300° F. Sorbent stream 221 and secondary oxygen stream 155 flow into the riser for in-bed sulfur removal and completion of substantially all combustion reactions. In the configuration shown in FIG. 3, the concepts and functionality of both of the gas—solids separation system and return of solids from standpipe to riser parts of the combustor are similar to the configurations shown in FIGS. 1 and 2.

Figure 4:
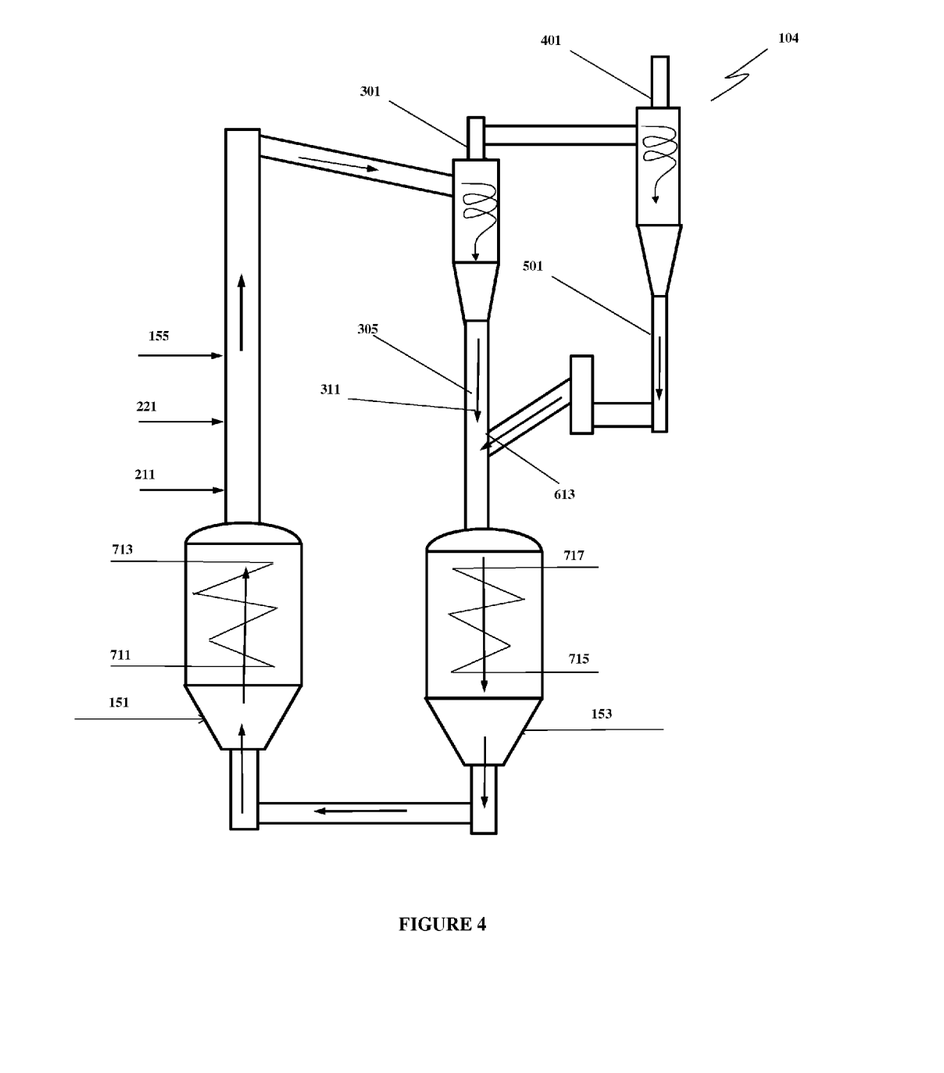
FIG. 4 is a schematic of the present oxy-fuel transport combustor loop configuration with both downward and upward flow solids coolers, according to an exemplary embodiment.

FIG. 4 illustrates yet another configuration of the present transport oxy-combustor with both solids downward flow and upward flow coolers. The basic combustor loop configuration 104 of FIG. 4 is similar to the configuration 103 of FIG. 3 with the exception of the cooler configuration. Although FIG. 4 shows one upward and one downward flow cooler, a plurality of coolers can be installed for both upward flow as illustrated in FIG. 3 and downward flow as illustrated in FIG. 2. In preferred embodiments, a single unit of the transport oxy-combustor has a steam production capacity sufficient to generate power in the range of approximately 500 to 1000 MWe. Such large capacity combustors require large heat transfer surface areas to extract heat from the circulating solids. Even with multiple coolers in configuration shown in FIG. 2 or 3, the height of the coolers becomes excessive to accommodate substantially all the heat transfer area. Arranging coolers in both down and up flow configurations as shown in FIG. 4 enables more coolers with heat transfer area proportioned between the down and up flow coolers. The overall height of a large capacity transport oxy-combustor can thus be reduced. The steam generation and superheater heat transfer surface areas are part of the downflow solids cooler with hot water or saturated steam entering through stream 715 and saturated water or superheated steam exiting through stream 717. In the upflow solids cooler, a driving force for heat transfer is less as the circulating solids entering the cooler are at lower temperature after transferring heat in the downflow cooler. The upflow cooler contains the large heat transfer area required for the economizer with boiler feedwater that enters through stream 711 is heated to steam drum operating conditions and exits the economizer through stream 713.

Figure 5:
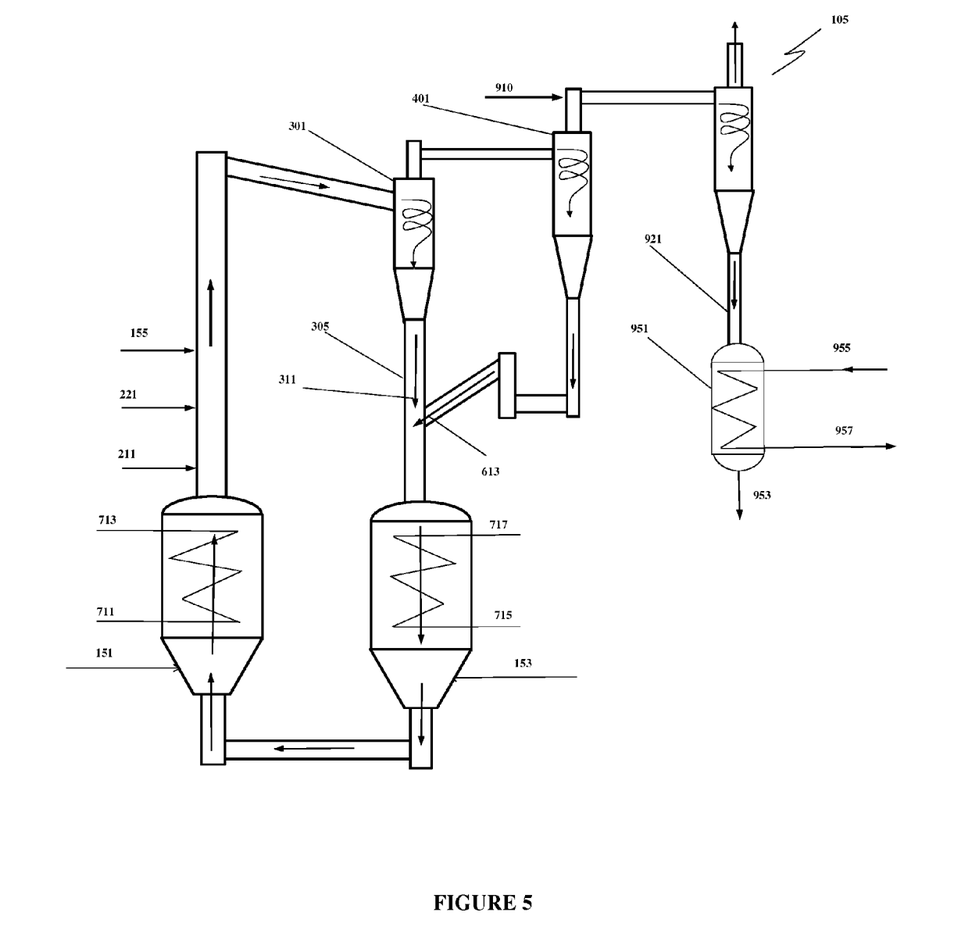
FIG. 5 is a schematic of the present oxy-fuel transport combustor loop configuration with oxygen scavenger injection and a third stage cyclone, according to an exemplary embodiment.

FIG. 5 illustrates yet another configuration of the present transport oxy-combustor configuration 105 that generates substantially oxygen-free flue gas. Normally, to complete the carbon conversion in the riser, it is necessary to have excessive oxygen fed to the riser through streams represented by 155. However, the excess oxygen in the flue gas stream has to be separated in the $CO_2$ purification process for nearly all unitizations of $CO_2$, including $CO_2$ sequestration. Further, the air separation process consumes energy with high capital, operating and maintenance costs. Thus, there is a need to maximize process efficiency and economics with respect to oxygen consumption.

In the present invention, the excess oxygen is substantially completely consumed by adding a scavenger that is preferably another stream of fuel, generating energy and eliminating the need for separating the oxygen from the flue gas to purify $CO_2$. The scavenging fuel can be gaseous or in solid form. A gaseous scavenging fuel is typically methane, and a solids scavenging fuel is typically non-volatile solids such as coke breeze.

In a preferred embodiment of the present invention shown in FIG. 5, the scavenging fuel to consume excess oxygen is injected at the exit of second stage cyclone 401. The additional residence time provided by the tangential flow of the scavenging fuel into the flue gas stream facilitates the consumption of oxygen. The exit concentration of oxygen in the flue gas is in the range of approximately 50 to 500 ppm. The scavenger fuel injected through stream 910 can be gaseous or solids fuel. At the operating temperature above approximately 1550° F. at the exit of second stage cyclone 401, substantially all fuel injected will react with the remaining oxygen to produce mainly $CO_2$ with trace amounts of CO. The additional energy released with scavenging reactions can be recovered with the flue gas cooler.

If a gaseous fuel is used for oxygen scavenging, the scavenging fuel may be nearly stoichiometric to consume the excess oxygen in the flue gas stream. Trace amounts to no scavenging fuel is present in the flue gas stream exiting the combustor, and that eliminates any additional steps that may be necessary to remove the scavenging fuel in the $CO_2$ purification step. If a solids fuel is used for scavenging, the scavenging fuel can be either slightly excessive or deficient to consume the excess oxygen. If the scavenging solids fuel is slightly more than the stoichiometric amount, the excessive scavenging fuel in the flue gas stream is collected together with some fine ash particles in a third stage cyclone, and the collected particles flow to a receiving vessel 951 through the cyclone dipleg 921. The solids collected in vessel 951 are cooled by the heat exchanger surfaces installed in the vessel. The cooling medium in the vessel can be, for example, water or steam, entering and exiting the vessel through streams 955 and 957. The cooled solids are discharged through stream 953 to the fuel handling system for further utilization.

Figure 6:
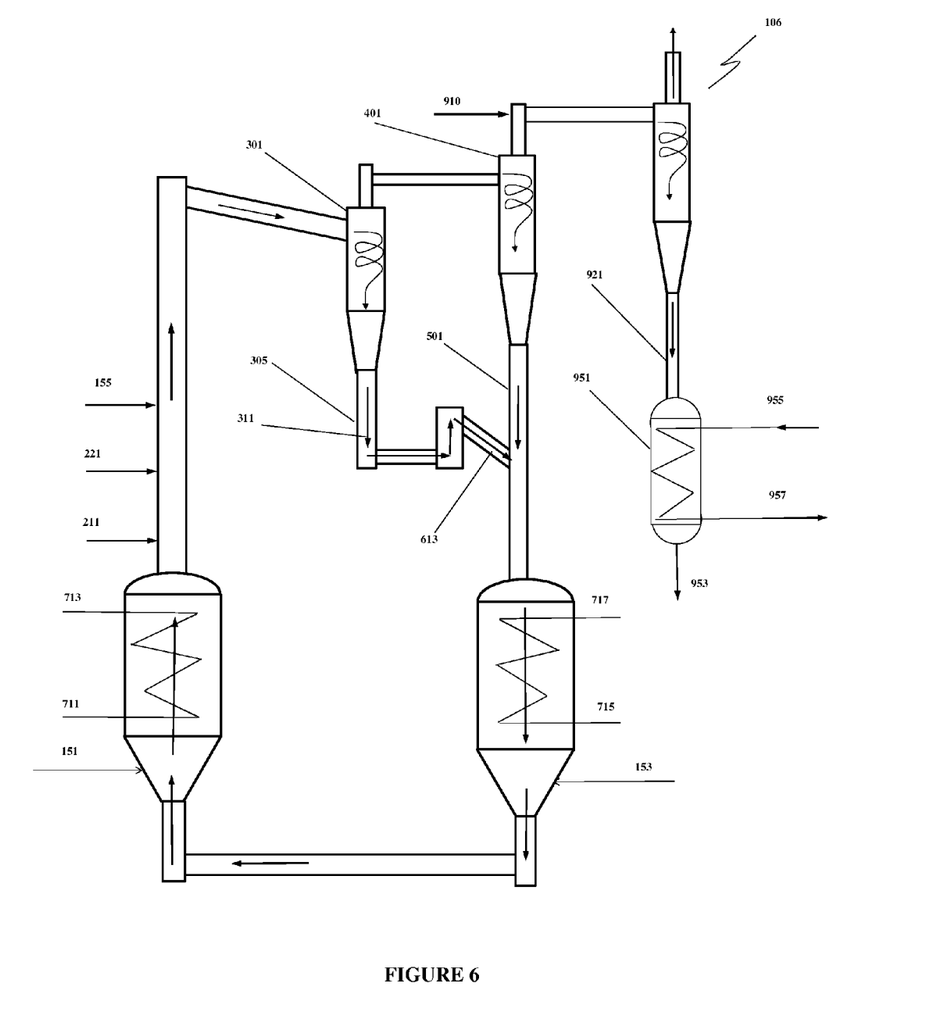
FIG. 6 is a schematic of the present oxy-fuel transport combustor loop configuration with seal-leg between the first stage cyclone dipleg and the standpipe, according to an exemplary embodiment.

FIG. 6 is yet another configuration of the present invention. The solids collected by the first stage cyclone flow through a seal-leg to standpipe and downflow solids cooler. In this configuration 106, the finer particles collected by the second stage cyclone flow down the dipleg straight into the standpipe without a seal-leg or loop seal.

Depending upon the characteristics of feed fuel, handling fines through seal-leg and a loop seal may not be feasible. In such cases, the configuration in FIG. 6 essentially avoids the finer particles from having to flow through bends in a seal-leg or loop seal, and the operation becomes more reliable. Depending upon the characteristics of solids feed fuel and excess oxygen needs, and the characteristics of solids scavenging fuel, the scavenging fuel 910 can be injected at the exit of the first stage cyclone. The third stage cyclone can be eliminated, as the crossover and the second stage cyclone provide sufficient residence time to consume the excess oxygen. Any excess scavenging fuel is collected by the second stage cyclone and, along with the circulating solids, flows to the riser where it will be substantially completely combusted.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A pressurized transport oxy-combustor comprising:
   a riser comprising a shell and insulation and erosion resistant refractory liners, wherein in the riser carbonaceous solids fuel is combusted in the presence of substantially pure oxygen and circulating solids, which combustion forms a flue gas stream comprising a gas-solids mixture;
   a first stage cyclone having an inclined tangential inlet;
   an inclined first crossover connecting the riser top with the first stage cyclone;
   a second stage cyclone;
   a second crossover connecting the first stage cyclone exit to the second stage cyclone;
   a third stage cyclone consuming excess oxygen in the flue gas stream with a scavenging fuel;
   a standpipe;
   a seal-leg under at least one of the first and second stage cyclones to return solids to the standpipe, and to provide a seal from a reverse flow of the flue gas stream; and
   at least one solids cooler, wherein the standpipe provides communication between the cyclones to the at least one solids cooler;
   wherein the at least one solids cooler is used to transfer combustion heat from the circulating solids to water and steam, forming one or more of steam and superheated steam;
   wherein the mass flow rate of the circulating solids is in the range of from approximately 150 to 400 times the carbonaceous solids fuel feed rate to the riser; and
   wherein the transport oxy-combustor operates in the pressure range of from approximately 30 to 1000 psia.

2. The transport oxy-combustor of claim 1, the riser further comprising:
   at least one fuel injection nozzle in a lower section of the riser to feed the carbonaceous solids fuel to the riser;
   at least two primary oxygen injection nozzles in the lower section of the riser to feed substantially pure oxygen into the riser at different elevations along the lower section of the riser;
   at least two secondary oxygen injection nozzles above the at least one fuel injection nozzle to feed substantially pure oxygen into the riser at different elevations; and
   at least two sets of aeration nozzles to feed an aeration gas in a lower section of the at least one solids cooler and the seal-leg to facilitate solids flow and heat transfer.

3. The transport oxy-combustor of claim 1, wherein the combustion of the solids fuel and substantially pure oxygen in the riser in the presence of the circulating solids moderates and controls the combustion temperature in the riser.

4. The transport oxy-combustor of claim 1, wherein at least one of the at least one solids cooler is an upward flow solids cooler located under the riser.

5. The transport oxy-combustor of claim 1, the riser further comprising a sorbent feed adding sorbent to the riser to at least partially remove unwanted species from the flue gas stream.

6. The transport oxy-combustor of claim 5, wherein the unwanted species is sulfur oxides, wherein the sorbent is one of limestone or dolomite, and wherein the molar ratio of calcium-to-sulfur is less than approximately 1.3.

7. The transport oxy-combustor of claim 5, wherein the unwanted species is sulfur oxides, wherein the sorbent is one of limestone or dolomite, and wherein the molar ratio of calcium-to-sulfur is less than approximately 1.3 to remove at least 99% of all sulfur components from the flue gas stream.

8. The transport oxy-combustor of claim 1, wherein the first stage cyclone has an inclined inlet solids loading capacity in the range of approximately 10 to 40 pounds of solids per pound of gas.

9. The transport oxy-combustor of claim 1, wherein the first stage cyclone has an inlet velocity in the range of approximately 25 and 55 ft/s.

10. The transport oxy-combustor of claim 1, wherein one of the at least one solids coolers is located at the bottom of the standpipe, such that circulating solids flow downwards into the at least one solids cooler located at the bottom of the standpipe and upwards and merge into the riser through one of the at least one solids cooler located at the bottom of the riser.

11. The transport oxy-combustor of claim 10, wherein the upward flow solids cooler uses oxygen as an aeration gas at the bottom of the solids cooler to minimize $CO_2$ recycle in the transport oxy-combustor.

12. The transport oxy-combustor of claim 1, wherein excess oxygen is utilized by injecting a gaseous or solids scavenging fuel at the exit of one of the first or second stage cyclones.

13. The transport oxy-combustor of claim 1, wherein a high mass flux of the circulating solids through the riser promotes combustion reactions to completion, increases the ability to absorb large amounts of released heat while maintaining combustion temperatures without the need for recycled flue gas components, and enables substantially complete capture of any sulfur components with high sorbent utilization.

14. The transport oxy-combustor of claim 1, wherein the rate of circulating solids enables energy throughputs based on the riser cross-sectional area in the range of from approximately 20,000 to 70,000 Btu/ft$^2$-sec.

15. The transport oxy-combustor of claim 1, wherein at least one of the at least one solids cooler is an upward flow solids cooler located under the riser; and
   wherein a fraction of the substantially pure oxygen feed is injected into the bottom of the upward flow solids cooler; and
   wherein the upward flow solids cooler operates in a transport regime in which the carrying capacity of the gas facilitates flow of circulating solids through the riser.

16. The transport oxy-combustor of claim 1, wherein excess oxygen is utilized by injecting a gaseous or solids scavenging fuel at the exit of one of the first or second stage cyclones, and the mixture of the injected fuel and flue gas enters another cyclone to extend the reaction time and to reduce the oxygen content in the flue gas to approximately from 50-500 ppm.

17. A transport oxy-combustor used for the combustion of a fuel with substantially pure oxygen as an oxidant to generate a flue gas stream containing moisture, wherein when at least a portion of the moisture is separated from the flue gas stream, a net flue gas stream rich in $CO_2$ exits the transport oxy-combustor, the transport oxy-combustor comprising:
   a riser comprising a primary oxygen feed and a solids fuel stream feed;
   a gas-solids separation device receiving a gas-solids mixture from the riser; and
   a downwards flow solids cooler receiving a solids stream including solids from the gas-solids separation device and providing an exit cooler solids stream;
   an upwards flow solids cooler;
   wherein the exit cooler solids stream travels from the downwards flow solids cooler through the upwards flow solids cooler and to a lower section of the riser, wherein in the riser, the exit cooler solids stream disperses substantially pure oxygen from the primary oxygen feed;

wherein the combustion of a solids fuel stream and dispersed substantially pure oxygen in the riser in the presence of the exit cooler solids stream moderates and controls the combustion temperature in the riser;

wherein the riser operates in the pressure range of from approximately 30 to 1000 psia; and wherein the mass flow rate of the circulating solids through the riser is in the range of from approximately 150 to 400 times the solids fuel stream feed rate to the riser.

18. The transport oxy-combustor of claim 17, wherein a high mass flux of the circulating solids through the riser promotes combustion reactions to completion, increases the ability to absorb large amounts of released heat while maintaining combustion temperatures without the need for recycled $CO_2$ or flue gas, and enables substantially complete capture of any sulfur components with high sorbent utilization.

19. The transport oxy-combustor of claim 17, wherein the transport oxy-combustor acts as a circulating fluidized bed combustor at sufficiently high solids circulation rates to make it unnecessary to use recycled $CO_2$ or flue gas as a means to moderate and control the combustion temperature in the riser.

20. The transport oxy-combustor of claim 17, wherein the solids fuel stream comprises a carbonaceous solids fuel stream, and is combusted with the substantially pure oxygen in the riser in a substantially complete oxidation, with the result that the net flue gas comprises from about 80-98% $CO_2$.

21. The transport oxy-combustor of claim 17, wherein the transport oxy-combustor acts as a circulating fluidized bed combustor at sufficiently high solids circulation rates;

wherein the gas phase superficial velocity in the riser of the circulating fluidized bed is in the range of from approximately 18 to 50 ft/s; and wherein the combustor operates in a transport regime in which the carrying capacity of the gas facilitates flow of circulating solids through the riser.

22. The transport oxy-combustor of claim 17, wherein the solids circulation rate enables energy throughputs based on the riser cross-sectional area is in the range of from approximately 20,000 to 70,000 $Btu/ft^2$-sec.

* * * * *